United States Patent
Pritchard

(10) Patent No.: US 7,954,318 B2
(45) Date of Patent: Jun. 7, 2011

(54) PTM SELF-BLEED/FAILSAFE OPEN SYSTEM FOR FWD AND RWD

(75) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 367 days.

(21) Appl. No.: 12/220,251

(22) Filed: Jul. 23, 2008

(65) Prior Publication Data

US 2009/0032755 A1 Feb. 5, 2009

Related U.S. Application Data

(60) Provisional application No. 60/962,744, filed on Jul. 31, 2007.

(51) Int. Cl.
*F15B 7/00* (2006.01)
*F15B 11/10* (2006.01)

(52) U.S. Cl. .......................................... 60/545; 91/433

(58) Field of Classification Search .................. 60/406, 60/453, 542, 545; 91/433, 443; 192/85.63
See application file for complete search history.

(56) References Cited

U.S. PATENT DOCUMENTS

| | | | |
|---|---|---|---|
| 4,574,931 A | 3/1986 | Kowalczyk | |
| 4,745,748 A | 5/1988 | Hayashi et al. | |
| 5,217,097 A | 6/1993 | Lasoen | |
| 5,303,807 A | 4/1994 | Domeneghini | |
| 5,556,356 A | 9/1996 | Hakamada et al. | |
| 5,611,407 A | 3/1997 | Maehara et al. | |
| 6,145,644 A | 11/2000 | Mohan et al. | |
| 6,273,057 B1 | 8/2001 | Schwoerer et al. | |
| 6,298,961 B1 | 10/2001 | Hageman et al. | |
| 6,378,682 B1 | 4/2002 | Monhan et al. | |
| 6,533,081 B2 | 3/2003 | Totsuka et al. | |
| 6,533,095 B2 | 3/2003 | Mohan et al. | |
| 6,595,338 B2 | 7/2003 | Bansbach et al. | |
| 6,655,756 B2 | 12/2003 | Riddiford et al. | |
| 6,658,951 B2 | 12/2003 | Harries et al. | |
| 6,692,396 B1 | 2/2004 | Grogg et al. | |
| 6,725,989 B1 | 4/2004 | Krisher et al. | |
| 6,883,657 B2 | 4/2005 | Bansbach et al. | |
| 6,923,212 B2 | 8/2005 | Tranovich et al. | |
| 7,182,194 B2 * | 2/2007 | Ronk et al. .................. 60/545 |

* cited by examiner

*Primary Examiner* — Michael Leslie
(74) *Attorney, Agent, or Firm* — Warn Partners, P.C.

(57) ABSTRACT

A hydraulic system having a solenoid bleed valve for bleeding air out of the system is provided. The present invention is a hydraulic system having an actuator, a coupling operably associated with the actuator, and a first solenoid valve operably associated with the actuator and the coupling, where the first solenoid is operable to control pressure applied to the coupling. The present invention also includes a second solenoid valve operably associated with the actuator and the first solenoid, where the second solenoid is operable to relieve pressure.

15 Claims, 1 Drawing Sheet

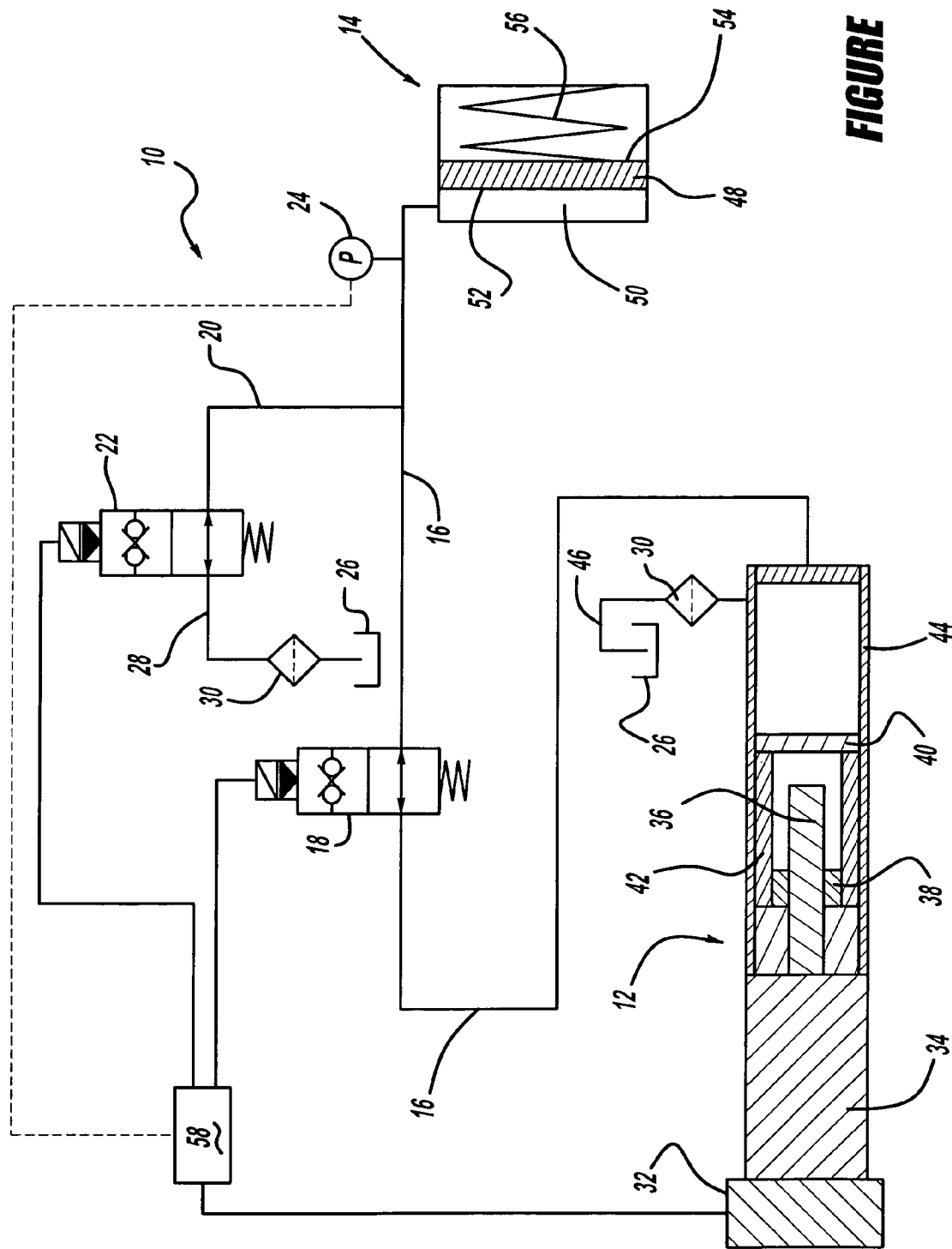
FIGURE

PTM SELF-BLEED/FAILSAFE OPEN SYSTEM FOR FWD AND RWD

CROSS-REFERENCE TO RELATED APPLICATIONS

This application claims the benefit of U.S. Provisional Application No. 60/962,744, filed Jul. 31, 2007. The disclosure of the above application is incorporated herein by reference.

FIELD OF THE INVENTION

The present invention relates to hydraulic systems that incorporate the use of a solenoid bleed valve that purges air from the system during operation.

BACKGROUND OF THE INVENTION

Hydraulic fluid circuits, also called hydraulic systems, are commonly used in automatic transmissions and transfer cases. These systems are typically used to actuate a coupling, with the coupling usually made up of a piston and a clutch pack. The system also typically includes an actuator for delivering fluid to the coupling to build fluid pressure behind the piston to apply the clutch pack.

One problem that can occur when using a hydraulic circuit in any type of application is that air can get into the system and affect the hydraulic system performance. Specifically, air in the system can have an effect of how the actuator will build fluid pressure in the coupling. Occasionally, the system needs to "bleed off," this is a process by which the air is purged from the system, so normal operation can be resumed. Prior methods of allowing the system to bleed off include the use of a manually operated bleed valve. The manually operated bleed valve is part of a closed loop hydraulic system that can be used to purge air from the system prior to operation. The use of a manual bleed valve has several disadvantages, one of which is the fact that the valve is manually operated, instead of being automatically operated. Also, manual bleed valves do not always release all of the air in the system.

Accordingly, there exists a need for an improved controllable bleed valve in a hydraulic circuit.

SUMMARY OF THE INVENTION

A hydraulic system having a solenoid bleed valve for bleeding air out of the system is provided. The present invention is a hydraulic system having an actuator, a coupling operably associated with the actuator, and a first solenoid valve operably associated with the actuator and the coupling, where the first solenoid is operable to control pressure applied to the coupling. The present invention also includes a second solenoid valve operably associated with the actuator and the first solenoid, where the second solenoid is operable to relieve pressure in the hydraulic system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The FIGURE is a schematic layout of a hydraulic clutch assembly having an actuator and a solenoid bleed valve, according to the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to the FIGURE, a hydraulic system according to the present invention is shown at 10. There is an actuator 12 and a coupling 14 connected to a first fluid conduit 16. Located along the first fluid conduit 16 is a first solenoid valve 18; in this particular embodiment, the first solenoid valve 18 is a solenoid pressure hold valve. Also connected to the first conduit 16 is a second fluid conduit 20; located along the second fluid conduit 20 is a second solenoid valve 22, and a pressure sensor 24. The second solenoid valve 22 in this embodiment is a solenoid bleed valve. The fluid supplied to the system 10 comes from a reservoir 26. Connecting the second solenoid valve 22 to the reservoir 26 is a third fluid conduit 28. Located along the third fluid conduit 28 is a filter 30, the function of which will be described later.

The actuator 12 in this embodiment is a ball screw actuator having a motor 32 in combination with a gear reduction set 34. The gear reduction set 34 is connected to a ball screw 36. It should be noted that while this embodiment includes the gear reduction set 34, the gear reduction set 34 may be eliminated, and the motor 32 connected to the ball screw 36 directly. Located on the ball screw 36 is a retaining nut 38, which is connected to a hydraulic piston 40 by a sleeve 42. The hydraulic piston 40 and ball screw 36 are located in an elongated cylinder 44. The elongated cylinder 44 is connected to the first fluid conduit 16. The elongated cylinder 44 is also connected to the reservoir 26 through a fourth fluid conduit 46, which also includes a filter 30.

The coupling 14 is of the type that is typically used to synchronize the rotation of multiple wheels. For instance, the coupling 14 can be used in a differential between two wheels, where the coupling 14 can be released to allow the wheels to rotate independently, fully engaged to force the wheels to rotate together, or partially engaged to allow a limited amount of relative rotation between each wheel, depending on driving conditions. The coupling 14 can also be used to split power between the front and rear wheels of a vehicle. For instance, if the rear wheels are the primary wheels used to propel the vehicle, the coupling 14 can be used to engage the front wheels if the rear wheels begin to slip because of a reduced amount of traction. The coupling 14 can be used to fully engage the front wheels, evenly splitting power between the front and rear wheels, or partially engaged to distribute power to the front wheels only when necessary.

When the coupling 14 is to be actuated, the motor 32 will drive the gear reduction set 34, causing the ball screw 36 to bi-directionally rotate. Rotating the ball screw 36 will cause the retaining nut 38 to translate in an axial direction along the ball screw 36, thereby causing the sleeve 42 and hydraulic piston 40 to translate in the elongated cylinder 44. If the hydraulic piston 40 is translated in the elongated cylinder 44 in a direction away from the ball screw 36, fluid will be forced out of the elongated cylinder 44 into the first fluid conduit 16. If the hydraulic piston 40 is translated in the elongated cylinder 44 in a direction toward the ball screw 36, the fluid from the reservoir 26 will be fed into the elongated cylinder 44 through the fourth fluid conduit 46.

When the first solenoid 18 is open, fluid will flow through the first solenoid valve 18 and into the coupling 14. In order for pressure to build in the coupling 14, the second solenoid valve 22 must be closed because the fluid will also flow into the second conduit 20, as well as the coupling 14. When the second solenoid valve 22 is closed, pressure on the fluid will build in the first fluid conduit 16, the second fluid conduit 20, and the coupling 14. The coupling 14 includes a piston 48 positioned in a fluid receiving chamber 50. The fluid entering the fluid receiving chamber 50 builds pressure on a first side 52 of the piston 48. The piston 48 also includes a second side 54, which applies pressure to a clutch pack 56.

As fluid is forced into the fluid receiving chamber 50, pressure will build on the first side 52 of the piston 48, causing the piston 48 to apply pressure to the clutch pack 56. The clutch pack 56 is used to transfer torque between two shafts, most often each shaft is connected to a wheel.

To release the pressure from the piston 20, the ball screw 34 rotates so as to retract the hydraulic piston 40, allowing fluid to reenter the elongated cylinder 44. The second side 54 of the piston 48 will no longer apply pressure to the clutch pack 56, returning the piston 48 in the position shown in the FIGURE.

There may be certain operating conditions where it is desired to have the coupling 14 engaged for extended periods of time. When this condition occurs, the actuator 12 will apply fluid pressure through the first fluid conduit 16 to engage the coupling 14. Once the pressure has reached some predetermined desired value, this pressure will be read by the pressure sensor 24, and the first solenoid 18 will engage. Engaging the first solenoid 18 will maintain the pressure in the first fluid conduit 16 between the first solenoid 18 and the coupling 14. This will allow the coupling 14 to remain engaged without the use of the actuator 12. Once it is no longer necessary to hold the coupling 14 at a constant pressure, the first solenoid valve 18 will open, and relieve the pressure in the coupling 14.

One particular feature included with the present invention is the use of the second solenoid 22, which is used to bleed air from the entire system 10. When too much air enters the system 10, the air can affect the amount of pressure applied to the coupling 14. Air is a compressible fluid, and can have an effect on how far the ball screw 36 must translate the hydraulic piston 40 in the elongated cylinder 44 to generate fluid pressure in the fluid receiving chamber 50. If the hydraulic piston 40 is translated to its maximum displacement toward the end of the elongated cylinder 44, air in the conduits 16,20 will become compressed and limit the build up of fluid pressure. This may limit the amount of force the piston 48 will apply in the coupling 14. If the amount of force applied by the piston 48 is reduced, the coupling 14 may not fully engage when needed. Minimizing the amount of air in the system 10 will allow for the greatest amount of accuracy and efficiency when applying pressure to the coupling 14.

To maximize the ability of the second solenoid valve 22 to bleed from the system 10, the second solenoid valve 22 is positioned above the other components of the system 10. Since the air in the system is less dense than the fluid, the air naturally flows from the various components such as the actuator 12, the first conduit 16, and the coupling 14 into the second fluid conduit 20 near the second solenoid valve 22. To release the air, the second solenoid valve 22 is opened while the first fluid conduit 16 and the second fluid conduit 20 are under pressure from the actuator 12. This causes any air to be released from the system 10. Also, if any excess fluid flows through the second solenoid valve 22, this excess fluid will simply flow through the second solenoid valve 22, through the third fluid conduit 28 having one of the filters 30, and back into the reservoir 26.

The system 10 also includes a "fail-safe open" feature which protects the various components from breaking if there is a sudden loss of electrical power. If a power failure occurs, the second solenoid valve 22 defaults to an open position to relieve any excess fluid pressure in the first conduit 16 and the second fluid conduit 20, as well as any of the remaining components in the system 10.

The actuator 12, the first solenoid valve 18, the second solenoid valve 22, and the pressure sensor 24 are all connected to a single controller 58. The controller 58 can engage the actuator 12, the first solenoid valve 18, the second solenoid valve 22, as well as read the pressure of the fluid in the system from the pressure sensor 24. The controller 58 engages and releases the first solenoid valve 18, the second solenoid valve 22, and the actuator 12 depending upon the desired operating conditions of the coupling 14. Also, the controller 58 can be used to control the bleed function of the second solenoid valve 22.

Having the second solenoid valve 22 perform the bleed function and the "fail-safe open" function replaces a conventional valve typically used to perform these functions. This has the advantage of more accurately bleeding the system, as well as preventing damage to the system in case of electrical failure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hydraulic system, comprising:
    an actuator;
    a coupling in fluid communication with said actuator through a first conduit;
    a first solenoid valve operably associated with said actuator and said coupling and located along said first fluid conduit in between said actuator and said coupling, wherein said first solenoid is operable to control pressure applied to said coupling;
    a second fluid conduit in fluid communication with said first fluid conduit;
    a second solenoid valve in fluid communication with said second fluid conduit and operably associated with said actuator and said first solenoid, wherein said second solenoid is operable to relieve pressure; and
    a third fluid conduit in fluid communication with said second solenoid valve and a reservoir such that said second solenoid valve is operable to allow air to flow from said first fluid conduit and said second fluid conduit through said third fluid conduit and into said reservoir, purging said air from said hydraulic system.

2. The hydraulic system of claim 1, wherein said actuator is further comprised of:
    a ball screw assembly having a hydraulic piston;
    an elongated cylinder for receiving said ball screw assembly and said hydraulic piston; and
    a motor having a gear reduction set, operably associated with said ball screw assembly, wherein said motor rotates said gear reduction set, said ball screw assembly translates said hydraulic piston in said elongated cylinder, forcing fluid through said first fluid conduit.

3. The hydraulic system of claim 1, wherein said first solenoid valve is a solenoid pressure hold valve, and said second solenoid valve is a solenoid bleed valve.

4. The hydraulic system of claim 1, wherein said coupling is further comprised of:
   a piston located in a fluid receiving chamber, said fluid receiving chamber in fluid communication with said first fluid conduit; and
   a clutch pack operably engaged by said piston, wherein fluid forced into said fluid receiving chamber increases in pressure, causing movement of said piston in said fluid receiving chamber and said clutch pack to engage, and when pressure on said piston is released, fluid pressure in said fluid receiving chamber is will be released, disengaging said clutch pack.

5. The hydraulic system of claim 1, wherein said actuator, said first solenoid valve, and said second solenoid valve are controlled by a single controller.

6. The hydraulic system of claim 1, wherein said second solenoid valve moves to an open position when there is an electrical power failure to said second solenoid valve.

7. The hydraulic system of claim 1, wherein said second solenoid valve is used to release fluid pressure from said coupling to prevent damage to said hydraulic system when fluid pressure is unsafe.

8. A hydraulic system having a solenoid bleed valve, comprising:
   an actuator for forcing fluid into a first fluid conduit;
   a solenoid pressure hold valve located along said first fluid conduit, downstream of said actuator;
   a coupling connected to said first fluid conduit downstream of said solenoid pressure hold valve;
   a second fluid conduit connected to said first fluid conduit between solenoid pressure hold valve and said coupling;
   a solenoid bleed valve connected to said second fluid conduit, wherein as said actuator is actuated and said solenoid bleed valve is closed to prevent fluid from flowing through said second fluid conduit, said solenoid pressure hold valve is opened allowing said actuator to force fluid through said first conduit into said coupling; and
   a third fluid conduit in fluid communication with said solenoid bleed valve and a reservoir;
   wherein said solenoid bleed valve is opened, and air in said first fluid conduit and said second fluid conduit is purged from said first fluid conduit and said second fluid conduit and allowed to flow into said reservoir and be released to the atmosphere.

9. The hydraulic system of claim 8, wherein said solenoid pressure hold valve, when energized, moves to a closed position causing pressure in said first fluid conduit, said second fluid conduit, and said coupling to be maintained.

10. The hydraulic system having a solenoid bleed valve of claim 8, wherein said solenoid bleed valve further comprises a fail-safe open feature, where said solenoid bleed valve is biased to an open position when no electrical power is transferred to said solenoid bleed valve.

11. The hydraulic system having a solenoid bleed valve of claim 8, wherein said coupling further comprises:
   a fluid receiving chamber for receiving fluid from said first fluid conduit; and
   a piston having a first side and a second side, located in said fluid receiving chamber such that when fluid is forced into said fluid receiving chamber from said first fluid conduit, pressure is applied to said first side of said piston, causing said piston to engage said coupling.

12. A method for providing a bleed feature in a hydraulic system, comprising the steps of:
   providing an actuator;
   providing a coupling;
   providing a first fluid conduit, positioned between said actuator and said coupling;
   providing a first solenoid valve located along said first fluid conduit, in between said actuator and said coupling;
   providing a second fluid conduit connected to said first fluid conduit in between said first solenoid valve, and said coupling;
   providing a second solenoid valve connected to said second fluid conduit;
   providing a third fluid conduit connected to said second solenoid valve and a reservoir;
   deactivating said first solenoid valve;
   activating said second solenoid valve;
   activating said actuator to force fluid through said first fluid conduit, into said second fluid conduit and said coupling, causing said coupling to engage;
   activating said first solenoid valve when said coupling is to be engaged for extended periods of time; and
   deactivating said second solenoid valve to bleed air out of said first fluid conduit, said second fluid conduit, and said coupling such that said air passes through said third fluid conduit into said reservoir, and said air releases to the atmosphere.

13. The method of claim 12, further comprising the steps of:
   providing said actuator to include a motor, a gear reduction set, a ball screw, a retaining nut, a hydraulic piston, and an elongated cylinder;
   activating said motor to drive said gear reduction set;
   bi-directionally rotating said ball screw with said gear reduction set;
   translating said retaining nut along said ball screw, as said ball screw is rotated;
   moving said piston in said elongated cylinder with said retaining nut; and
   forcing fluid into said first fluid conduit, said second fluid conduit, and said coupling as said piston moves in said elongated cylinder.

14. The method of claim 12, further comprising the step of providing said second solenoid valve with a failsafe open feature.

15. The method of claim 14, further comprising the step of providing said failsafe open feature by opening said second solenoid valve when electrical power is cut from said second solenoid valve.

* * * * *

UNITED STATES PATENT AND TRADEMARK OFFICE
CERTIFICATE OF CORRECTION

| | | |
|---|---|---|
| PATENT NO. | : 7,954,318 B2 | Page 1 of 1 |
| APPLICATION NO. | : 12/220251 | |
| DATED | : June 7, 2011 | |
| INVENTOR(S) | : Larry A. Pritchard | |

It is certified that error appears in the above-identified patent and that said Letters Patent is hereby corrected as shown below:

Column 5,
Line 11, Claim 4, delete "will be".

Signed and Sealed this
Thirtieth Day of August, 2011

David J. Kappos
*Director of the United States Patent and Trademark Office*